Oct. 4, 1932.                H. A. WADMAN                1,880,536
                    APPARATUS FOR ANNEALING GLASSWARE
                          Filed Feb. 21, 1929
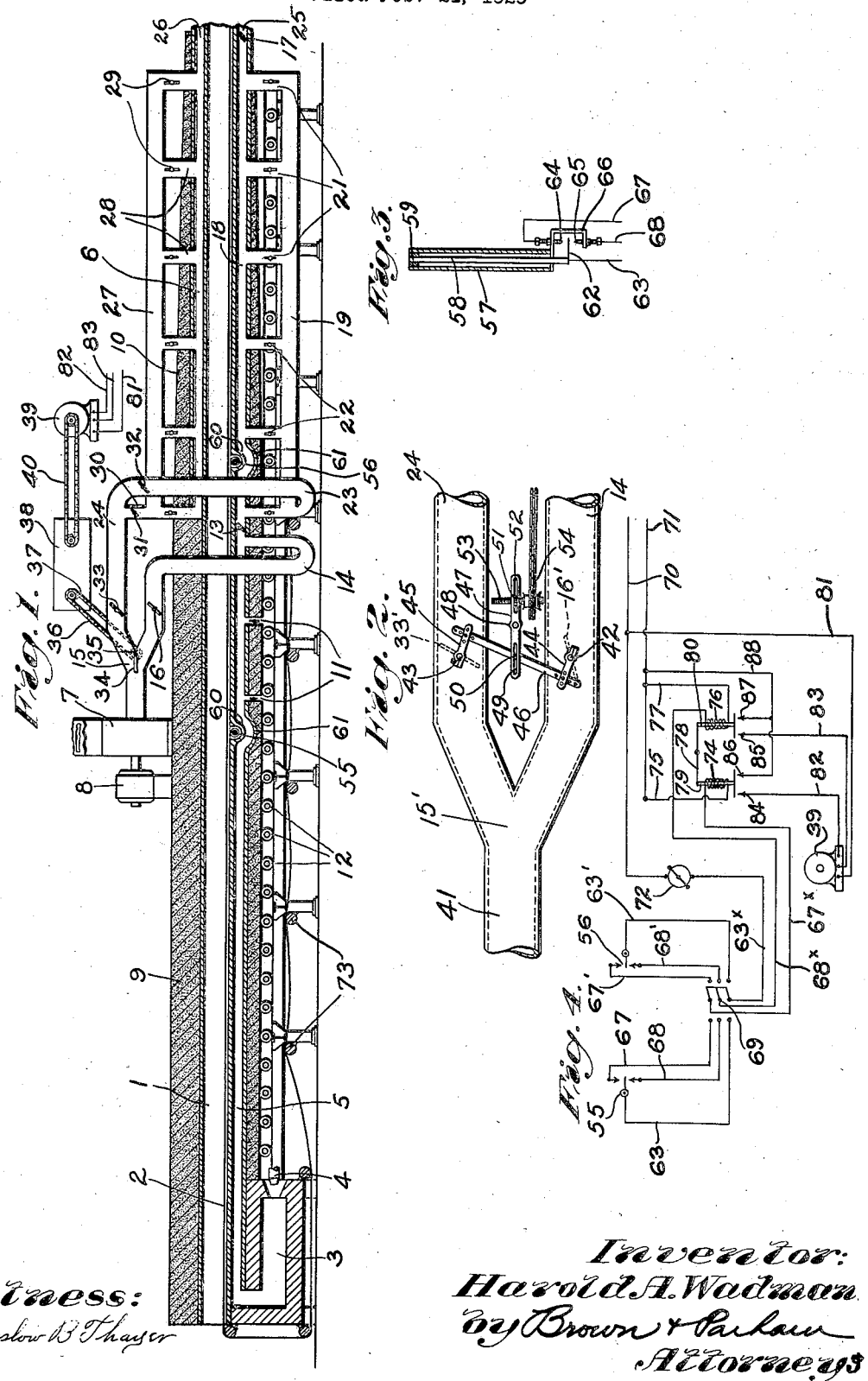
Witness:
Inventor:
Harold A. Wadman
by Brown & Parham
Attorneys Patented Oct. 4, 1932

1,880,536

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR ANNEALING GLASSWARE

Application filed February 21, 1929. Serial No. 341,634.

This invention relates to an apparatus and method for continuously annealing glassware, and more particularly to a tunnel type glass annealing lehr in which there are means for supplying heat to the ware in the tunnel, means for withdrawing heat therefrom, and both manual and automatic control means for controlling the supplying and withdrawing of heat, whereby glassware may be annealed in a simple and effective manner with a minimum of attention from a skilled operator.

An object of my invention is to provide a continuous tunnel type glass annealing lehr in which there are means associated with both the top and bottom of the lehr tunnel for cooling or withdrawing heat from the ware, and manually operating means for effecting a relative adjustment of the top and bottom cooling means.

A further object of my invention is to provide in association with a glass annealing lehr tunnel, of the character above described, a flue portion through which either heating or cooling media may be passed, whereby this portion may be used in preheating the lehr tunnel in starting the lehr and may subsequently be used in cooling the glassware during the operation thereof.

A further object of my invention is to provide a new and useful combination of flues in association with a glass annealing lehr tunnel of the character above described, in which a variety of possible heating and cooling combinations may be had to effect the desired temperature gradient in the lehr and thus properly to anneal various types of ware and ware supplied at various rates.

It has been found in practice that glass annealing lehrs must be used with various rates of supply of glass thereto. If a large amount of glass is supplied to the lehr, a large amount of heat is brought in with the glass, so that a smaller amount of heat must be supplied thereto in the lehr tunnel, and a greater amount of cooling is required. Conversely when the rate of supply of glass to the lehr is decreased, a smaller amount of heat is brought in, so that more heat must be supplied in the lehr tunnel and, at the same time, less heat need be taken out of the glassware, so that less cooling is required. For compensating for these variations, I have found it desirable to provide a reciprocal adjustment of the heat supplying and heat withdrawing means. The provision of such a reciprocal adjustment is a further object of my invention.

Another object of my invention is to provide a lehr of the character described, in which there are cooling means for withdrawing heat from the glassware in the lehr and in which the effectiveness of the cooling means, or the rate of withdrawal of heat thereby, may be suitably controlled by a thermostat suitably located so as to be effected by the temperature of the glass at a desired point in the tunnel.

A further object of my invention is to control the temperature gradient in the lehr in response to a thermostat located at a point adjacent to that part of the tunnel at which it is desired that the ware attain its "low annealing temperature". By this, is meant the temperature at which permanent strains will not be reintroduced into the ware by further comparatively rapid cooling. Beyond this point the glass may be cooled more rapidly and in fact up to that rate of cooling at which it might break. However, above this point, if the cooling is carried on too fast, permanent strains will be reintroduced into the glass and the whole purpose of annealing will be defeated. I have found that it is particularly advantageous to control the character of the temperature curve in the lehr by a thermostat located at or near this point.

Also in glass annealing lehrs, of the general type herein shown, and also of the general type shown in the patent to Mulholland, No. 1,560,481, granted November 3, 1925, the lower flue is constructed in the bottom of the tunnel and is separated therefrom by a relatively thin sheet of good heat conducting material, and also by a conveyor of open wire mesh fabric which offers little resistance to the passage of heat, so that there is good heat transference between the gases in the flue and the glass passing through the tunnel. This construction and mode of operation results in the glass acquiring approximately the temperature of the gases in the flue after it has passed a short distance along the lehr tunnel. Adjacent to or in the zone where such thermal equilibrium exists and before the equilibrium is disturbed by the effect of the positive cooling means, it is desirable to position a thermostat adjacent to the glass, so as to be responsive to the temperature thereof, and to control the temperature controlling means of the lehr in response to this thermostat. The provision of such a combination is a further object of my invention.

My invention also includes the method of operation in a particular manner, namely, the controlling of the cooling means in response to the temperature of the glass; the controlling of the temperature gradient in a lehr in response to the temperature of the glass at such a point in the lehr as it is desired that the glass attain approximately its "low annealing temperature", and the controlling of the temperature gradient in the lehr in response to the temperature of the glass at such a point in the lehr where it is desired that the glass be thermal equilibrium with the temperature controlling media by which the temperature gradient in the lehr is controlled.

Further objects and advantages of my present invention will be apparent from a reading of the following specification and sub-joined claims, when taken in connection with the accompanying drawing, in which:

Figure 1 is a somewhat diagrammatic view in vertical longitudinal section of a lehr embodying my invention;

Fig. 2 is a fragmentary elevation showing a modified form of reciprocal damper control;

Fig. 3 is a diagrammatic sectional view of one of the thermostats, usable with my lehr construction; and Fig. 4 is a diagram of a system of electrical connections by which the thermostatic regulation of the temperature gradient in the lehr may be effected.

Referring to Fig. 1, the lehr comprises an longate tunnel 1, which may be constructed of similar sections as described in the Mulholland patent above referred to, an endless conveyor 2 passing through the tunnel 1 and being driven by any suitable mechanism, not shown, for example, the mechanism shown by the Mulholland patent.

Beneath the entering end of the lehr is arranged a suitable fire box 3, which may be heated in any desired manner as, for example, by an oil or gas burner 4, means being also provided for admitting controllable amounts of air to the fire box to support combustion and dilute the gases sufficiently to bring them to the desired temperature, all as shown and described in the Mulholland patent above referred to. The gases passing from the fire box 3 are conducted through a flue 5, which is formed in the bottom wall of the tunnel 1 and extends, as shown in Fig. 1, from end to end of the lehr, the end of the flue 5 at the exit end of the lehr preferably being opened to the atmosphere. Formed in the roof of the tunnel 1 and extending from the exit end thereof part way toward the entrance end, is an upper flue generally indicated at 6, this flue also being open to the atmosphere at the exit end of the lehr. The exit end of the lehr is not shown, but should be understood to be substantially the same as the construction shown at the point where it is broken off at the right hand side of Fig. 1. A suitable exhaust fan, or other draft producing device 7 is provided adjacent to the lehr tunnel and is connected to the several flues as will be hereinafter described, this fan being operated in any suitable manner as, for example, by an electric motor 8.

Suitable insulating material generally indicated at 9 is shown surrounding the tunnel 1, this showing, however, being entirely diagrammatic. The insulating material which is of some suitable character, as powdered kieselguhr, is preferably diminishing in thickness toward the exit end of the lehr, as indicated at 10, so as to permit a greater dissipation of heat than at the part of the tunnel adjacent to the entrance end.

A plurality of dampered air inlet openings 11 are used in connection with the flue 5, these openings being of progressively varying cross-sectional areas from one end of the lehr toward the other if desired, and being provided with suitable dampers therein. Any desired number of such air inlet openings and any desired distribution thereof, may be made along the flue 5 as may seem desirable in accordance with the ware to be annealed, or the particular problem which may have to be met in any installation. This much of the construction is substantially the same as that shown in the Mulholland application above referred to, as also is the method of supporting the lehr upon rollers 12 and providing for expansion thereby, the end of the tunnel 1 at the fire box 3 being suitably anchored and the remainder of the tunnel being supported for expansive movement on the rollers 12.

At a suitable point intermediate the ends of the flue 5, a damper 13 is provided which extends completely across its flue and is adapted entirely to close off communication between the flue sections on the right and left hand sides thereof, as seen in Fig. 1. Immediately adjacent to the dampers 13, but on the hot side thereof, that is, the left hand side as seen in Fig. 1 is a take-off duct 14 by which the gases may be withdrawn from the portion of the flue 5 to the left of the damper 13 and conducted to the draft control chamber 15 and thence to the exhaust fan 7, a suitable manually operated damper 16 being provided in this duct for a purpose hereinafter to be described. Thus the section of the flue 5 to the left of the damper 13, as seen in Fig. 1, may be operated exclusive of any of the rest of the circulatory system of the lehr for the purpose of controlling the temperatures in corresponding portions of the lehr tunnel. Controllable amounts of atmospheric air may be admitted through the dampered openings 11 to control the temperature gradient along this section of the flue 5.

A second damper 17 similar to the damper 13 is disposed in the flue 5 adjacent to the exit end of the lehr, and with the damper 13, serves to define a portion 18 of the flue 5, which portion may be used for either heating or cooling the portion of the tunnel 1 adjacent thereto in a manner presently to be described. A longitudinally disposed take-off conduit 19 is provided substantially parallel to the flue portion 18 and is connected thereto by a plurality of dampered passages 21, which are controlled by suitable dampers 22, the passages having progressively larger cross-sectional areas toward the exit end of the lehr, as is clearly shown in Fig. 1 of the drawing. The take-off conduit 19 communicates through the duct 23 and duct 24 with the draft control chamber 15 and thence with the exhaust fan 7.

Thus if the damper 13 be opened and the dampers 16 and 17 closed, the hot gases from the fire box 3 will pass along a material portion of the length of the flue 5 including a part or all of the flue portion 18 and thence through the passages 21 to the take-off conduit 19, thence through the ducts 23 and 24 and draft control chamber 15 to the exhaust fan 7. This method of operation is useful in starting the lehr for the purpose of preheating the tunnel. Due to the fact that the passages 21 have increasing cross-sectional areas along the lehr, the hot gases will be withdrawn therefrom in progressively larger amounts, so that the preheating of the lehr tunnel will be regulable as to its degree automatically by the variation in cross-sectional areas of the passages 21 and manually in addition by the settings of the several dampers 22 in these passages. Thus the heating of the portion of the tunnel adjacent to the flue portion 18 may be controlled as desired.

On the other hand, if the damper 13 be closed and the damper 17 opened, the flue portion 18 will serve as a cooling flue through which air may be drawn in from the outer atmosphere through the open end 25 of the flue 5, past the damper 17, thence through the several passages 21 to the take-off flue 19, and through the ducts 23 and 24 to the exhaust fan, as above described. As the passages 21 have progressively decreasing cross-sectional areas along the line of flow of the cooling air, the cooling effect of the air remaining in the flue portion 18 will be progressively decreasing, and a desired temperature gradient of the ware adjacent thereto will be effected. This desired relation may be effected after trial by a proper designing of the cross-sectional area of the several passages 21, or by a manual adjustment of the dampers 22, or both. It is desired, however, that in practice the dampers 22 remain in a fixed adjusted position and that the mechanism operate substantially automatically.

The upper cooling flue 6 is provided with an open end at 26 and also with a take-off conduit 27, similar to the take-off conduit 19, the conduit 27 being connected with the flue 6 through a plurality of passages 28 provided with dampers 29 correspondingly respectively to the passages 21 and dampers 22, above described. Preferably the design of this upper flue 6 and its connections including the cross-sectional areas of the passages 28, is similar to that of the flue portion 18 and its take-off means. The take-off flue 27 is connected by a duct 30 with the duct 24, which leads to the draft control chamber 15 and thence to the exhaust fan 7. Thus the upper portion of the tunnel may be cooled during the operation of the lehr in a similar manner to the lower portion thereof when using the flue portion 18 as a cooling portion.

I provide means for varying the cooling effects of the flues 6 and 18 respectively, comprising a pair of manually operated dampers 31 and 32 disposed respectively in the take-off ducts 30 and 23, leading from the take-off conduits 27 and 19 respectively. By an adjustment of the dampers 31 and 32 the draft through flues 6 and 18 are hence the cooling effect relative and total of these flues above and below the ware may be varied.

The portion of the flue 5 to the left of the damper 13, as seen in Fig. 1, may be used as a heat supplying flue and the flues 6 and 18 both as cooling flues by closing the damper 13 and opening the dampers 16 and 17, this being one arrangement which may be used during the operation of the lehr. According to this mode of operation, the dampers 16 and 33 may be adjusted to a desired position to control the relative effects of the suction device 7 upon the heating and cooling flues and thus manually to control the relative amounts of heat supplied and heat withdrawn. If, however, it is desired to control this relative heating and cooling automatically, I provide a damper 34 secured to a shaft 35 upon which a suitable sprocket wheel is fixed and provide a chain 36 to operate the sprocket wheel, this chain passing around a sprocket 37 which is rotated as desired through a suitable reducing gearing diagrammatically indicated at 38 by an electric motor 39, connected to the reducing gearing 38 by the sprocket and chain means 40, the motor 39 being reversible in any well known manner and being controlled by apparatus hereinafter to be described. Thus by a movement of the damper 34 in a clockwise direction, the effect of the fan 7 will be directed to a greater extent to the heating flue 5 to the left of the damper 13 and to a lesser extent to the duct 24 through which the cooling gases pass from the flues 6 and 18; and conversely, by movement of the damper 34 in a counterclockwise direction, the heating will be reduced and the cooling increased. This reciprocal adjustment is particularly applicable in the case of variation in the rate of supply of ware to the lehr. For example, if the amount of ware, that is the total weight per minute coming into the lehr is increased, as for example by the starting of another forming machine or any other cause, additional heat will be introduced into the lehr with the glass, so that a smaller amount need be supplied in the lehr, and a greater amount of heat must be removed from the ware, so that the rate of withdrawal of heat must be increased. Conversely, if the weight of ware per minute is reduced for and cause, a smaller amount of heat will be brought into the lehr, and more heat must be supplied properly to anneal the ware, and a smaller amount of heat must be removed from the ware to bring it to substantially room temperature. This variation in the rate of supply of the ware to the lehr may be compensated for advantageously by the reciprocal adjustment above described, the variation from a direct reciprocal adjustment being taken care of by the manual adjustment of dampers 16 and 33 or by means presently to be described with respect to the form of the invention shown in Fig. 2.

In Fig. 2, wherein similar reference characters represent corresponding parts, the flue or duct member 41 leading to the exhaust fan 7 and ducts 14 and 24 corresponds to the construction above described. Reference characters 16' and 33' represent dampers which correspond generally to dampers 16 and 33 shown in Fig. 1, and which are mounted upon shafts 42 and 43 respectively. Arms 44 and 45 are adjustably secured to the shafts 42 and 43 respectively, the provision for relative angular adjustments between the shafts and their operating arms being for the purpose of permitting a manual adjustment of the dampers with respect to their operating arms for effecting a manual adjustment corresponding to the manual adjustment of dampers 16 and 33 (Fig. 1) in addition to the automatic adjustment presently to be described. The arms 44 and 45 are interconnected by a link 46 which may be connected to the arms 44 and 45 in a plurality of different positions for permitting variation both in the relative position of the dampers for a given position of the actuating means, and also a variation in their relative movement with a given movement of the actuating means. This variation in adjustment is secured by providing the link 46 with a plurality of holes at either end and providing each of the arms 44 and 45 with a plurality of holes, so that pins may be inserted through any desired holes in the arms 44 and 45 and the link 46. For moving the link 46, I provide a rocker member 47 pivoted at 48 to a suitable fixed part of the device and having an elongate slot 49 in one end thereof embracing a suitable pin or slide 50, secured to the link 46. For operating the rocker member 47, I provide a suitable swivelly mounted screw and threaded nut, the latter having a projection thereon indicated at 51 which moves in an elongate opening 52 formed in the other end of the rocker member 47. The nut upon which the projection 51 is located is threaded upon the swivelly mounted screw 53, which may be rotated by a sprocket and chain indicated at 54. Any suitable means such as the reducing gearing 38, sprocket and chain means 40 and motor 39 shown in Fig. 1, may be used for operating the sprocket and chain mechanism 54, shown in Fig. 2. Thus the draft through the heating and cooling flues of the lehr may be reciprocally regulated, and the direct reciprocal relation of the regulation may be varied as desired.

While I have shown the reciprocal regulation applied solely to a flue combination for heating and cooling a lehr, specifically by controlling the relative draft in the respective flues, I contemplate any reciprocal regulation of any heat supplying and heat withdrawing means to be accomplished by any well known system of temperature control, of which the mechanisms shown are an example.

For controlling the temperature gradient along the lehr and more specifically for controlling the reciprocal adjusting means above described by operating the motor 39 in one direction or the other as may be required to effect the desired temperature conditions in the lehr, I provide a thermostat which is located so as to be responsive to the temperature of the ware at a desired point in the lehr tunnel. In Fig. 1 and in the diagram of the electrical connection in Fig. 4 are shown two thermostats which are arranged to be alternatively used for accomplishing the above described purposes. The provision of two thermostats is to provide for handling ware of different types in which the reciprocal adjustment will be more effective to give the desired temperature gradient with a relatively large variation in the rate of supply of glass to the lehr when one thermostat is used rather than when the other thermostat is used, due to their different location.

In general, however, I desire to place the thermostat so as to be responsive to the temperature of the ware at the point in the tunnel where it is desired that the ware attain substantially its "low annealing temperature". As above described this point is that below which permanent strains will not be reintroduced into the ware and beyond which the rate of cooling may be accelerated materially without damage to the ware. I have shown at 55 a thermostat which may be considered for purposes of illustration to be substantially at the above point for the particular lehr in question. However, I do not wish to be limited to the specific dimensions or construction of the lehr herein shown as regards the location of this point. The other thermostats 56 I have located in the flue portion 18, as the control from the ware temperature at this point may be advantageous in certain cases.

When the ware is brought to the lehr, it is usually not at the desired annealing temperature and may be either hotter or cooler, depending upon the conditions through which it has passed and a variety of factors, most of which are indeterminate. The first thing taking place in the lehr is the bringing of the ware to the proper annealing temperature, which is effected either by heating or cooling, as may be required. This action takes place in the first portion of the tunnel adjacent to the fire box 3, the gases in the flue 5 at this place being controlled as to temperature in the manner described in the Mulholland patent above referred to, namely by admitting an amount of air to the fire box 3 necessary to bring the gases to the desired temperature. From this point and throughout the next zone in the lehr, the glass is maintained at approximately its annealing temperature for a time sufficient to permit the working out of any permanent strains which may exist therein. During this period of time, the glass is substantially in thermal equilibrium with the gases in the flue 5 as the conveyor 2 and the bottom wall of the tunnel 1 which separate the ware from the gases in the flue 5 are both of light relatively good heat conducting material, so that the passage of heat between the gas and the ware is little obstructed. The ware is then cooled relatively gradually through a temperature range to its "low annealing temperature", this cooling advantageously being controlled not only by the temperature of the gases in the flue 5 and their velocity, but by the insulation 9 about the tunnel 1, so that throughout this range, the glass is in substantial thermal equilibrium with the gases. This thermal equilibrium zone or range of temperature of the ware and gases in the flue 5 may be determinative in a muffle lehr of the type herein shown of the zone in which a thermostat may advantageously be located to be responsive to the temperature of the ware for the purpose of controlling the temperature gradient in the tunnel, and more specifically for the purpose of controlling the heating and cooling reciprocally, as has been described above. The thermostat 55 is located to be responsive to the temperature of the glass in this zone as it is responsive to the temperature of the ware at the point in the tunnel where it is desired that the ware attain its "low annealing temperature", that point being one of the limits of the thermal equilibrium zone.

In each case the thermostat is constructed of a concentric tube 57 and rod 58 (Fig. 3) suitably secured together at one end as shown at 59, and adapted to expand longitudinally with respect to each other, due to the different character of the materials from which they are constructed. For example, I may use a nickel tube and a quartz rod. The thermostats 55 and 56 are disposed within cupped portions 60 of the floor of the lehr tunnel 1 and the bottom of the flue 5 is suitably cupped down therebeneath as at 61, so as to provide for the substantially unobstructed passage of the gases past cupped portion 60 of the floor of the tunnel. Thus the thermostat will be influenced primarily by the temperature of the ware and to a smaller extent by the temperature of the gases passing therebeneath as the conveyor 2 upon which the ware is supported is of light openwork material, preferably wire mesh belting of low heat capacity which offers little resistance to the passage of heat therethrough directly to the thermostat. The rod 58 of each thermostat is provided with a suitable electrical contact 62 which has a lead wire 63 connected thereto and which is adapted to contact with the adjustable contact points 64 and 65 formed as threaded screws extending through a suitable bracket 66 and suitably insulated therefrom. Thus when the thermostat is heated above the normal temperature for which it is set, the outer nickel tube 57 will expand to a greater extent than the inner quartz rod 58 and the contact member 62 will contact with the point 64 closing a circuit between wires 63 and 67. On the other hand, when the temperature falls to a sufficient extent, the nickel tube 57 will contract to a greater extent than the qaurtz rod 58, bringing the contact member 62 into engagement with the contact point 65 and thus connecting the wire 63 with the wire 68 which is connected to the contact point 65. By a suitable adjustment of the screws bearing the contact point 64 and 65, the distance between the points may be varied, thus varying the amount of expansion or contraction necessary to move the contact member 62 from one of its contacting positions to the other, and in addition, by a suitable adjustment of the screws, the range of temperatures at which contact will be made may be adjusted independently of the difference between the limiting temperatures, these adjustments being usual in thermostatic devices and not in themselves being any part of the present invention except as they may be used in carrying out the objects thereof.

Referring now to Fig. 4, I have shown wires 63, 67 and 68 from the thermostat 55 and 63′, 67′ and 68′ to similar contacts on the thermostat 56, these wires leading to a suitable threeway double throw switch indicated generally at 69 and leading therefrom through wires 63x, 67x and 68x. By this arrangement, either thermostat may be used alternatively by merely throwing the switch 69. I have shown line wires 70 and 71, wire 70 being connected to wire 63x, through the make-and-break switch 72, which comprises a continuously rotating member having contacts at its opposite sides connected together and adapted periodically to make and break connections between the wires 70 and 63x, each time the rotary member of switch 72 makes a half revolution. This member is adapted to be rotated by any suitable means, for example by one of the rollers 73 (Fig. 1), which support the return strand of the conveyor 2, or by any other suitable means. The speed of rotation of the rotary member of the switch 72 is such that a contact will be made for a predetermined short period of time between wires 70 and 63x, for example at intervals of one a minute and extending over a period of perhaps three seconds, although these periods of time are not to be considered as limiting. The wire 67x is connected to one end of a solenoid coil 74, the other end of which is connected to the line wire 71 by a wire 75; and the wire 68x is connected to one end of the solenoid coil 76, the other end of which is connected by a wire 77 to the line wire 71. Thus, when contact is made by the thermostat in operation between the contact member 62 and one of the members 64 or 65, one of the solenoid coils 74 or 76 will be energized to move the respective core thereof and the bridge member of the switch toward the contact points shown therebelow in Fig. 4. A suitable mechanical interengaging rocker member 78 is provided between the solenoid cores 79 and 80 for the purpose of preventing both being engaged with their respective contact points simultaneously, the rocker member 78 insuring that one of the bridge members is disengaged from its contact points prior to the engagement of the other. These connections constitute relays for operating the motor 39 in one direction or the other, one wire 81 of the motor being connected to the line wire 70 and the wires 82 and 83 which are effective to rotate the motor in one direction or the other in the manner usual in reversible motors being connected respectively to one of the contact points 84 and 85, respectively, of the solenoid operating switches, the other contact points 86 and 87 of these switches respectively being connected by the wire 88 to the line wire 71. Thus it will be seen that when one of the cores 79 or 80 is moved downwardly, as shown in the diagram in Fig. 4, to make contact by its respective bridge member between the points 84 and 86 or 85 and 87, respectively, the motor will be operated in one direction or the other, the period of operation being that at which the rotary member of the switch 72 maintains a contact between wires 70 and 63x, there being suitable springs (not shown) as is the usual practice associated with the core of each of the solenoids for the purpose of withdrawing the core and bridge member when the solenoid is deenergized.

In operation, assuming the device to be operating in its normal manner with a certain weight of ware being supplied thereto per minute and with the parts in equilibrium, the damper 13 may be closed and the damper 17 open so that the flue section 18 is used as a cooling flue. The dampers 22 and 29 are adjusted as may be desired to provide for the proper distribution of the cooling. The dampers 31 and 32 are adjusted as desired to provide for the proper distribution of cooling above and below the tunnel. The dampers 16 and 33 are manually adjusted as may be desired to provide for the proper basic adjustment for heating and cooling for the particular type of ware. The automatic damper 34 is controlled automatically by the motor 39 operating in response to one of the thermostats, so that as the supply of glass is substantially constant, this automatic damper will not be moved to a material extent.

Assuming now that the weight of glass per minute is increased. This brings in more heat to the lehr and the thermostat 55, if this thermostat is being used, will be heated to a higher temperature than before, thus expanding the tube 57 to a greater extent than the rod 58 (Fig. 3) and bringing the contact points 62 and 64 together. This will connect the wires 63 and 67. This condition will be maintained without more until the rotary member of the make-and-break switch 72 connects wires 70 and 63x, at which time a circuit will be closed through line wire 70, switch 72, wire 63x, wire 63, contact points 62 and 64, wires 67 and 67x, solenoid coil 74 and wire 75 to the line wire 71. This will move the core 79 of the solenoid coil 74 downwardly making a contact between points 84 and 86 which will complete a circuit through the motor 30 as follows: line wire 70, wire 81, the motor 39, wire 82, contact points 84 and 86, and wire 88 to the line wire 71. This will actuate the motor in such a direction that the damper 34 (Fig. 1) is moved in a counter-clockwise direction thus decreasing the draft through the flue 5 to the left of damper 13 (Fig. 1) and increasing the draft through the duct 24. This change will decrease the heat supplied to the ware and increase the rate of withdrawal of heat. This movement of the damper 34 will be continued only as long as the rotary member of the switch 72 makes a contact between the wires 70 and 63x, which may be three seconds. After this contact is broken, the solenoid core 79 will be raised by its spring (not shown) to open the motor circuit above described and thus stop the motor 39. If, when the rotary member of the make-and-break switch 72 again makes contact between the wires 70 and 63x at the end of a half revolution, the conditions have not been rectified and the thermostat 55 again restored to its neutral position, a further movement of the damper 34 will be made in the manner above described. If the motor has moved the dampers 34 too far, the thermostat will have cooled to such an extent that the contact members 62 and 65 will be connected and a circuit will be completed upon the next connection through the make-and-break switch 72, through the solenoid coil 76 in a manner similar to that above described, which will move the core 80 to make contact between the points 85 and 87 and rotate the armature of the motor 39 in the opposite direction, thus moving the damper 34 in the opposite direction. This back and forth action of the damper 34 will take place until the proper conditions have been achieved in the lehr, after which no further action will take place until the conditions are again disturbed.

On the other hand, if the rate of supply of ware to the lehr is reduced from the normal, the thermostat will be moved by the lower amount of heat supplied to make a connection between the points 62 and 65 which will energize the motor 39 through the connections above described to move the damper 34 in a clockwise direction, thus increasing the heating effect and decreasing the cooling effect in the lehr tunnel. For certain types of ware it may be more advantageous to control the reversal of movement of the movement of the motor 39 by the thermostat 56 which is located nearer the cooler end of the lehr than is the thermostat 55 and for this purpose all that is necessary to accomplish this change will be to throw the three-way double throw switch 69 to the right, as seen in Fig. 4, whereupon similar operations may be had.

If desired, the flue portion 18 may be used as a continuation of the heating flue 5 by opening the damper 13 and closing the damper 17. When this is done, the reciprocal adjustment of the heating and cooling will be tempered to some extent by the fact that the adjustment will now be between the draft in a portion of the flue which is solely directed to heating on the one hand, namely, that part of the flue to the left of the connection between the flue 5 and the duct 14, as seen in Fig. 1, and, on the other hand, the combined draft of heating and cooling gases from the flue portion 18 and the cooling flue 6. When this method of operating the device is used, the reciprocal adjustment will usually not be employed, and all of the heating gases from the flue 5 be withdrawn through the take-off conduit 19 and the duct 23. The control then will be manually effected in a manner similar to that described in connection with the Mulholland patent above referred to. However, this arrangement offers a novel combination of flues in that the heating gases are withdrawn from the bottom flue at a plurality of points, namely the passages 21, which are controlled by the dampers 22 and which have progressively increasing cross-sectional areas toward the cool end of the lehr. The use of the flues shown in any possible useful combination in annealing glassware is within the purview of my invention.

While I have shown and described my invention with regard to but two embodiments and in a somewhat diagrammatic manner, I contemplate that many changes might be made therein and the constructions herein shown and described may be useful in various manners as may be desired, and therefore I do not wish to be limited except by the scope of the appended claims, which are to be construed as broadly as the state of the prior art permits.

I claim:

1. Apparatus for annealing glassware, comprising an elongate tunnel, means for moving articles of glassware therethrough, a longitudinally extending temperature controlling flue associated therewith, means for supplying a hot medium to said flue adjacent to the entrance end of said tunnel, the opposite end of said flue being in communication with a source of cooling medium, means for causing a flow of both media and withdrawing them from said flue, two passages communicating between said flow causing means on the one hand and said flue at points spaced apart longitudinally thereof on the other hand, and a damper in said flue adjacent to and toward the cool end of said tunnel from each of said points of communication between said flue and each of said passages, whereby when said dampers are respectively opened and closed, the portion of said flue between said points will be connected to conduct hot media therethrough for supplying heat to adjacent portions of said tunnel, and conversely when said dampers are respectively closed and opened, said portion of said flue will be connected to conduct the cooling medium to withdraw heat from the adjacent portions of said tunnel.

2. Apparatus for annealing glassware, comprising an elongate tunnel, means for moving articles of glassware therethrough, a longitudinally extending temperature controlling flue associated therewith, means for supplying a hot medium to said flue adjacent to the entrance end of said tunnel, the opposite end of said flue being in communication with a source of cooling medium, means for causing a flow of both media and withdrawing them from said flue, two passages communicating between said flow causing means on the one hand and spaced points along said flue on the other, a damper in said flue adjacent to and toward the cool end of said tunnel from each of said points, whereby when said dampers are respectively opened and closed, the portion of said flue between said points will be connected to conduct the hot media therethrough for supplying heat to adjacent portions of said tunnel, and conversely when said dampers are respectively closed and opened, said portion of said flue will be connected to conduct the cooling medium to withdraw heat from the adjacent portions of said tunnel, and means disposed at spaced intervals along said portion of said flue for determining the temperature gradient therein and effective whether the flue be used with heating or cooling media.

3. Apparatus for annealing glassware, comprising an elongate tunnel, means for moving articles of glassware therethrough, a longitudinally extending temperature controlling flue associated therewith, means for supplying hot gases to said flue adjacent to the entrance end of said tunnel, the opposite end of said flue being open and in communication with the atmosphere, means for causing a flow of both media and withdrawing them from said flue, a connecting passage between said flow causing means and a point in said flue intermediate its ends, a take-off conduit also communicating with said withdrawing means and communicating with said flue by a plurality of longitudinally spaced passages located toward the open end of said flue from said point, said passages having progressively greater cross-sectional areas toward said open end, a damper in said flue between said point of communication between said flue and the first of said passages, and a second damper in said flue between the last of said passages and said open end.

4. Apparatus for annealing glassware, comprising an elongate tunnel, means for moving articles of glassware therethrough, a longitudinally extending temperature controlling flue associated with said tunnel, means for supplying a heating medium to said flue adjacent to the entrance end of said tunnel, means for causing a flow of said medium and withdrawing it from said flue, and a take-off conduit communicating with said flow causing means and communicating with said flue by a plurality of longitudinally spaced passages, said passages having progressively greater cross-sectional areas toward the discharge end of said tunnel, whereby the temperature gradient in said flue and consequently in corresponding portions of said tunnel is determined.

5. Apparatus for annealing glassware, comprising an elongate tunnel, means for moving articles of glassware therethrough, means for supplying heat to a portion of said tunnel, means for withdrawing heat from another portion of said tunnel, and a unitary means for simultaneously effecting positive and direct reciprocal adjustments of both said heat supplying and said heat withdrawing means, whereby to compensate for variations in the rate of supply of glass to the apparatus.

6. Apparatus for annealing glassware, comprising an elongate tunnel, means for moving articles of glassware therethrough, a heating flue associated with one portion of said tunnel, a cooling flue associated with another portion of said tunnel, means to supply heating and cooling media to said flues respectively, means to cause a draft in each of said flues, and a unitary means to effect positive and direct reciprocal adjustments of the drafts simultaneously in each of said flues, whereby to compensate for variations in amount of heat introduced into the apparatus by the glass.

7. Apparatus for annealing glassware, comprising an elongate tunnel, means for moving glassware therethrough, two temperature controlling flues associated therewith, means to control the temperatures in one of said flues by passing a heating medium therethrough in the same direction as the movement of the glass through said tunnel, means to control the temperatures in the other of said flues by passing a cooling medium therethrough in the opposite direction to that of the glass, and a unitary means for simultaneously effecting positive and direct reciprocal adjustments of the amounts of heating and cooling media passing through each of said flues.

8. Apparatus for annealing glassware, comprising an elongate tunnel, means for moving articles of glassware therethrough, a temperature controlling flue associated with one wall of said tunnel, means to supply hot gases to said flue adjacent to the entrance end of said tunnel, means disposed at intervals along said flue for controlling the temperature therein, a cooling flue associated with another wall of said tunnel and having one end open to the atmosphere, a draft producing device, conduits connecting each of said flues with said draft producing device, and a unitary means for simultaneously effecting positive and direct reciprocal adjustments of the drafts in said conduits.

9. Apparatus for annealing glassware, comprising an elongate tunnel, means for moving articles of glassware therethrough, heating means associated with a portion of said tunnel, a cooling flue associated with a portion of one wall of said tunnel and being open to the atmosphere adjacent to the discharge end of said tunnel, a longitudinally extending take-off conduit disposed substantially parallel to said cooling flue, a draft producing device connected with said take-off conduit, a plurality of dampered passages extending between said cooling flue and said take-off conduit at intervals along their lengths, whereby the cooling effect of the air in said cooling flue may be varied in selected zones, and a unitary means for simultaneously effecting positive and direct reciprocal adjustments of said heating means and the draft in said take-off conduit.

10. Apparatus for annealing glassware, comprising an elongate tunnel, means for moving articles of glassware therethrough, means for supplying heat to a portion of said tunnel, means for withdrawing heat from another portion of said tunnel, a thermostat located so as to be influenced by the temperature of the glassware at a selected point in said tunnel, and means operated by said thermostat for simultaneously effecting positive and direct reciprocal adjustments of said heat supplying and said heat withdrawing means, whereby to compensate for variations in the amount of heat introduced into the apparatus by the glass.

11. Apparatus for annealing glassware, comprising an elongate tunnel, means for moving articles of glassware therethrough, a heating flue associated with one portion of said tunnel, a cooling flue associated with another portion of said tunnel, means to supply heating and cooling media to said flues respectively, means to cause a draft in each of said flues, a thermostat located at a selected point in said tunnel so as to be responsive to the temperature of the ware adjacent thereto, and means operated by said thermostat for simultaneously effecting positive and direct reciprocal adjustments of the drafts in said flues, whereby to compensate for variations in the heat introduced into the apparatus by the glass.

12. Apparatus for annealing glassware, comprising an elongate tunnel, means for moving articles of glassware therethrough, a longitudinally extending temperature controlling flue associated with said tunnel, means to supply hot gases to said flue adjacent to the entrance end of said tunnel, a longitudinally extending cooling flue also associated with said tunnel and being open to the atmosphere adjacent to the exit end of said tunnel, means disposed at intervals along each of said flues for controlling the temperatures of the gases in selected zones therein, a draft producing device connected to both of said flues, a thermostat located at a selected point in said tunnel so as to be responsive to the temperature of the ware adjacent thereto, and means operated by said thermostat for simultaneously effecting positive and direct reciprocal adjustments of the drafts in said flues, whereby to compensate for variations in the rate of supply of glass to the apparatus.

13. Apparatus for annealing glassware, comprising an elongate tunnel, means for moving articles of glassware therethrough, a longitudinally extending temperature controlling flue associated with the bottom wall of said tunnel, means for supplying hot gases to said flue adjacent to the entrance end of said tunnel, a cooling flue in prolongation of the first named flue and having one end open to the atmosphere adjacent to the exit end of said tunnel, a second cooling flue associated with the roof of said tunnel and having one end open to the atmosphere adjacent to the exit end of said tunnel, a draft producing device connected to all of said flues, a thermostat located at a selected point in said tunnel so as to be responsive to the temperature of the ware adjacent thereto, and means operated by said thermostat for simultaneously effecting positive and direct reciprocal adjustments of the drafts in said first named flue on the one hand the two cooling flues on the other, whereby to compensate for variations in the rate of supply of glass to the apparatus.

14. Apparatus for annealing glassware, comprising an elongate tunnel, means for moving articles of glassware therethrough, a longitudinally extending cooling flue associated with one wall of said tunnel and having one end open to the atmosphere adjacent to the exit end of said tunnel, a conduit disposed substantially parallel to said flue, a draft producing device communicating with said conduit, a plurality of passages having varying cross-sectional areas communicating between said flue and said conduit at intervals along their lengths, a thermostat located at a selected point in said tunnel so as to be responsive to the temperature of the ware adjacent thereto, and means operated by said thermostat for varying the flow of air through said conduit in accordance with the amount of cooling required by the ware being annealed.

15. Apparatus for annealing glassware, comprising an elongate tunnel, means for moving articles of glassware therethrough, heating and cooling means associated with said tunnel, unitary means for simultaneously effecting positive and direct reciprocal adjustments of said heating and cooling means to compensate for variations in the rate of supply of ware to the apparatus, and manually adjustable means for varying the character of the reciprocal adjustment effected by said unitary means.

16. Apparatus for annealing glassware, comprising an elongate tunnel, means for moving articles of glassware therethrough, means for applying heat to at least a portion of said tunnel including means for conducting a heat producing medium, means for withdrawing heat from a portion of said tunnel different at least in part from the portion to which heat is supplied, including means for conducting a cooling medium in heat transferring relation with the tunnel, and a unitary means effective simultaneously to adjust the resistances to the passage of the heat producing and cooling media through their respective conducting means in a positive and direct manner and in a reciprocal sense one respect to the other, whereby to compensate for variations in the rate of heat introduction into the lehr by the glass.

17. Apparatus for annealing glassware, comprising an elongate tunnel, means for moving articles of glassware therethrough, means for supplying heat to a portion of said tunnel, means for withdrawing heat from a portion of said tunnel different at least in part from that portion to which heat is supplied, a unitary automatic means for simultaneously effecting positive and direct reciprocal adjustments of both said heat supplying and said heat withdrawing means, and manual means for adjustably determining the relative extent of the adjustments effected for a given adjustive movement of the automatic adjusting means.

18. Apparatus for annealing glassware, comprising an elongate tunnel, means for moving articles of glassware therethrough, means for supplying heat to a portion of said tunnel, means for withdrawing heat from a portion of said tunnel different at least in part from that portion to which heat is supplied, a unitary automatic means for simultaneously effecting positive and direct reciprocal adjustments of both said heat supplying and said heat withdrawing means, and manual means for adjustably determining the extent of at least one of said adjustments for a given adjustive movement of the automatic adjusting means.

Signed at Hartford, Connecticut, this 16th day of February 1929.

HAROLD A. WADMAN.